(12) United States Patent  
Numakami et al.

(10) Patent No.: US 7,350,039 B2  
(45) Date of Patent: Mar. 25, 2008

(54) PROCESSING CONTROLLER, DATA PROCESSOR, PROCESSING CONTROLLING METHOD, PROGRAM THEREOF AND RECORDING MEDIUM STORING THE PROGRAM

(75) Inventors: Yukio Numakami, Tokorozawa (JP); Tetsuya Kawahara, Tokorozawa (JP); Motooki Sugihara, Tsurugashima (JP); Koji Matsuura, Tokorozawa (JP); Naoaki Horiuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 308 days.

(21) Appl. No.: 11/141,711

(22) Filed: Jun. 1, 2005

(65) Prior Publication Data

US 2005/0289594 A1 Dec. 29, 2005

(30) Foreign Application Priority Data

Jun. 2, 2004 (JP) ............................. 2004-164937

(51) Int. Cl.  
*G06F 13/00* (2006.01)  
*H04N 5/445* (2006.01)

(52) U.S. Cl. ...................................... 711/154; 711/100

(58) Field of Classification Search ................ 711/100, 711/111, 154; 725/45, 53  
See application file for complete search history.

(56) References Cited

U.S. PATENT DOCUMENTS 5,699,549 A * 12/1997 Cho ............................ 711/115  
5,872,933 A * 2/1999 Kanai et al. ................ 709/231  
6,779,079 B2 * 8/2004 Hirose et al. ............... 711/112  
2003/0154344 A1 * 8/2003 Itoi ............................ 711/100  
2003/0167382 A1 * 9/2003 Lee ............................ 711/154

FOREIGN PATENT DOCUMENTS

JP 2002-27337 1/2002  
JP 2002-94916 3/2002

* cited by examiner

*Primary Examiner*—Tuan V. Thai  
(74) *Attorney, Agent, or Firm*—Kratz, Quintos & Hanson, LLP

(57) ABSTRACT

A CPU 290 of a recording/reproducing device 200 acquires automatic video recording request information, and generates, based on EPG data previously acquired, new automatic reservation information incorporating basic video recording information with video recording start date and time or video recording finish date and time for contents corresponding to a keyword in the automatic video recording reservation request information and priority information indicating that the priority is "intermediate". When the CPU 290 determines that the video recording time indicated by the reservation information corresponding to a manual video recording reservation incorporated in a video recording reservation list information and that for the new automatic reservation information overlap each other, the CPU 290 deletes the reservation information corresponding to the manual video recording reservation from the video recording reservation list information, and incorporates the new automatic reservation information as reservation information in the video recording list information.

20 Claims, 6 Drawing Sheets

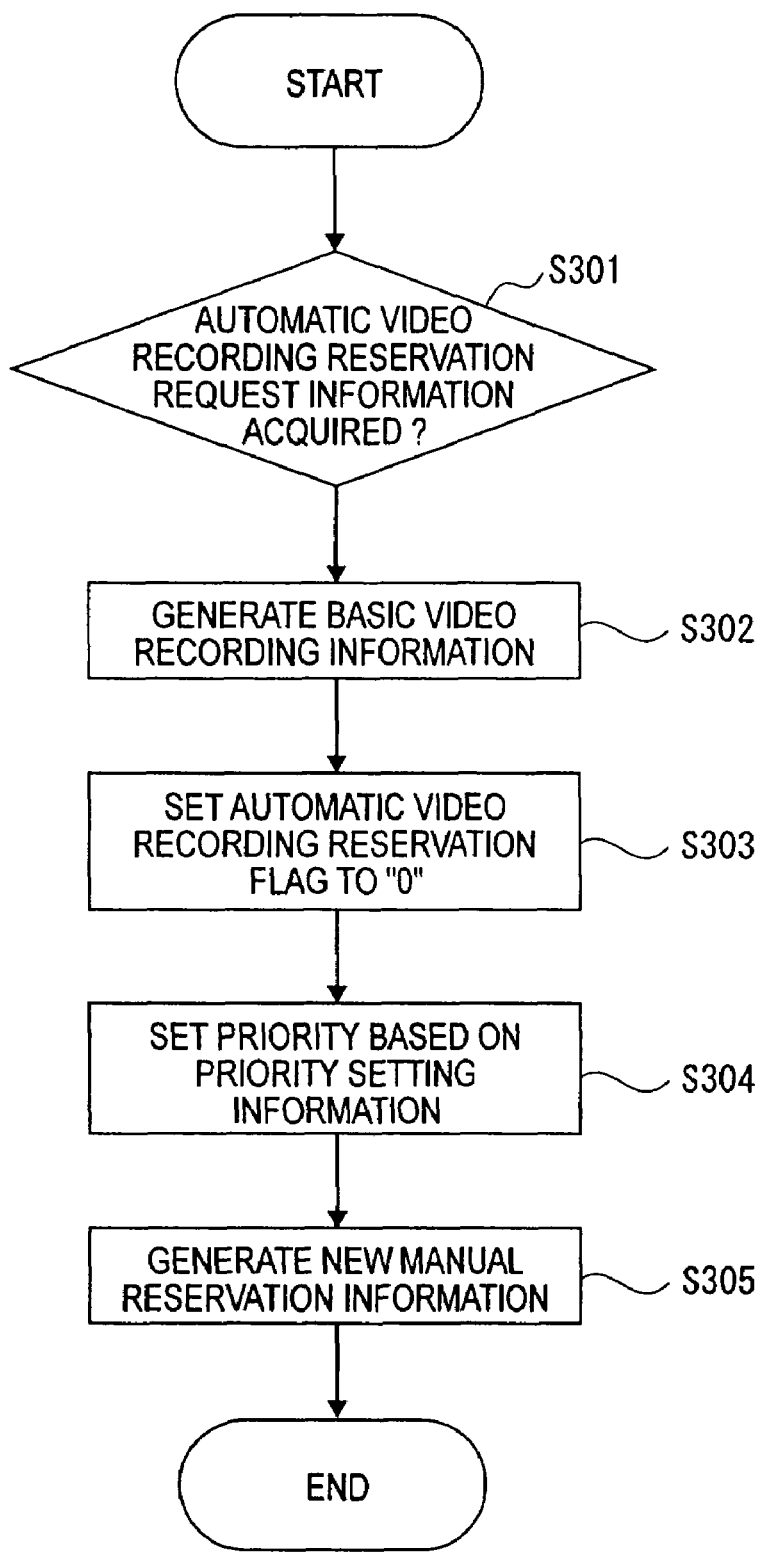

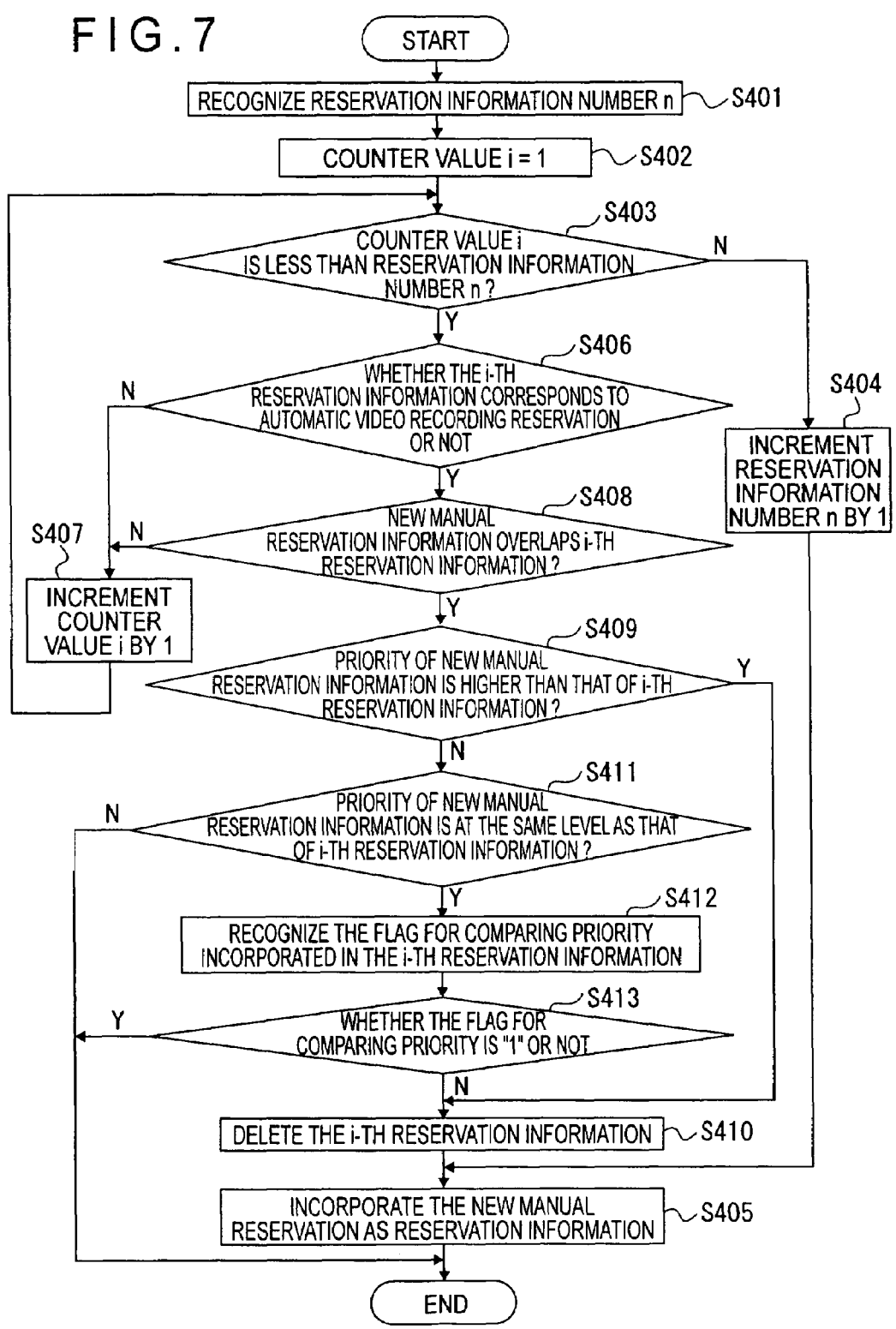

PROCESSING CONTROLLER, DATA PROCESSOR, PROCESSING CONTROLLING METHOD, PROGRAM THEREOF AND RECORDING MEDIUM STORING THE PROGRAM

BACKGROUND OF THE INVENTION

1. Field of the Invention

The present invention relates to a processing controller controlling to acquire data, a data processor, a processing controlling method, a program for thereof, and a recording medium storing the program.

2. Description of Related Art

There has been known a recording/reproducing device used, for instance, for reserving video recording of contents such as a TV program (Refer to, for instance, Document 1: Japanese Patent Laid-Open Publication No. 2002-94916, and Document 2: Japanese Patent Laid-Open Publication No. 2002-27337).

The recording/reproducing device described in Document 1 stores video recording reservation setting information concerning contents A reserved to be recorded into a RAM. Then the recording/reproducing device compares the video recording reservation setting information to the video recording reservation setting information for contents B already stored in the RAM, and when the broadcasting time zones overlap, the recording/reproducing device displays an inquiry to ask a user whether priority reservation should be set or not. If the user replies that the user prefers the contents A, the contents A is recorded, and a portion of contents B in the time zone not overlapped with contents A is also recorded.

The recording/reproducing device described in Document 2 extracts program information data concerning contents to be broadcasted in the near future from a broadcast signal such as MPEG (Moving Picture Coding Experts Group) or the like and stores the information in a memory. Further the recording/reproducing device accepts a reservation for contents viewing or video recording of the contents or the like, and stores the program information data concerning this reservation in a reservation table in the memory. When the recording/reproducing device receives a new reservation and recognizes that there is another reservation overlapped with the new reservation in the reservation table, the recording/reproducing device determines, for instance, that a reservation for charged broadcasting is at a higher priority level than a reservation for charge-free broadcasting. Further when both the two reservations are for charge-free broadcasting or for charged broadcasting, the recording/reproducing device determines, for instance, that a reservation for broadcasting based on the HD (High Definition) system is at a higher priority level than a reservation for broadcasting based on the SD (Standard Definition) system. Then the recording/reproducing device displays to the user, for instance, that the reservation for charged broadcasting is effective and that for charge-free broadcasting is not effective.

In the configuration as described in Document 1 or Document 2 above, however, there is a recording/reproducing device having a function for automatically reserving video recording by acquiring, for instance, EPG (Electric Program Guide) date concerning a program which is contents broadcasted through, for instance, a surface wave digital broadcasting and a keyword set and inputted by a user, and searching the contents corresponding to the keyword based on the EPG data. In the configuration as described above, when an automatic reservation for video recording overlaps with a reservation for video recording made by a user by specifying date and time for starting the video recording, data and time for finishing the video recording, a channel number, or the like (described as manual reservation for video recording hereinafter), it is conceivable that the manual reservation for video recording which is a reservation for recording contents specified by the user is treated preferentially. In the configuration as described above, however, even when the contents automatically reserved for video recording satisfies the user's preference more than the contents manually reserved for video recording, the manual reservation for video recording is preferentially treated, and the contents more satisfying the user's preference may not be recorded, which is disadvantageous.

SUMMARY OF THE INVENTION

In view of the foregoing, it is an object of the present invention to provide a processing controller capable of acquiring data properly, a data processor, a processing controlling method, a program thereof, and a recording medium storing the program.

The processing controller according to the present invention controls a data acquiring unit adapted for acquiring data to acquire the data, and the processing controller includes a request information acquiring unit for acquiring request information which requests that the data concerning specified contents or the data related to prespecified contents be acquired by the data acquiring unit; a guidance information acquiring unit for acquiring guidance information corresponding to and concerning the contents of the data acquired by the data acquiring unit based on the request information; a priority information acquiring unit for acquiring priority information concerning priority for being acquired by the data acquiring unit in data concerning the specified contents as well as in data related to prespecified contents based on the request information; a comparing unit for comparing overlapping state of the contents of the acquired guidance information; and an acquiring control unit for controlling the data acquiring unit to acquire either one of the data concerning the specified contents and the data related to the prespecified contents overlapped with each other in content, based on the priority information in the data concerning the specified contents and the data related to the prespecified contents each corresponding to the guidance information including overlapped contents.

The data processor according to the present invention includes the aforesaid processing controller, the data acquiring unit, and a data storage control unit performing controls so that the data acquired by the data acquiring unit is stored in a storage unit.

The processing control method according to the present invention controls, with a computing unit, a data acquiring unit adapted for acquiring data to acquire the data, in which the computing unit executes the steps of: acquiring request information which requests that the data concerning specific contents or the data related to prespecified contents be acquired with the data acquiring unit; acquiring guidance information corresponding to and concerning the contents of the data acquired by the data acquiring unit based on the request information; acquiring priority information concerning priority for being acquired by the data acquiring unit in the data concerning the specific contents as well as the data related to the prespecified contents; comparing overlapping state of the contents of the acquired guidance information;

and controlling the data acquiring unit to acquire either one of the data concerning the specific contents and the data related to the prespecified contents overlapped with each other in content, based on the priority information in the data concerning the specified contents and the data related to the prespecified contents corresponding to the guidance information having overlapped contents.

The processing control program according to the present invention make a computing unit function as the aforesaid processing controller.

The processing control program according to the present invention makes a computing unit execute the aforesaid processing control method.

The recording medium according to the present invention stores therein the aforesaid processing control program in a manner readable by a computing unit.

BRIEF DESCRIPTION OF THE DRAWINGS

FIG. 6 is a flow chart illustrating a process of incorporating new manual reservation information in the embodiment; and FIG. 7 is a flow chart illustrating a process of incorporating new manual reservation information in the embodiment.

DETAILED DESCRIPTION OF PREFERRED EMBODIMENT(S)

Descriptions are provided below for an embodiment of the present invention with reference to the related drawings. The following descriptions are made with reference to a recording/reproducing device having a data processor with the processing controller according to the present invention as an example, but the present invention is not limited to this configuration, and any configuration for storing data in a data storage unit may be employed in the present invention. In descriptions of the embodiment below, a process for recording contents is referred to as a video recording process. Further in this embodiment, basic information for setting video recording is acquired and this basic information for setting video recording includes information concerning start time for video recording, information concerning finish time for video recording, channel information and the like. In the following descriptions a process of reserving recording of a TV program identified by this basic information for setting video recording is referred to as manual video recording reservation processing. The information for start time of video recording and information for finish time of video recording function as guidance information and distribution time information in the present invention. Further the video recording processing carried out based on the manual video recording reservation is referred to as manually reserved video recording processing. Further a keyword based on character information as request information set and inputted by a user is recognized. For instance, processing for reserving recording of a TV program relating to the recognized keyword by referring, for instance, to EPG (Electric Program Guide) data described hereinafter is referred to as automatic video recording reservation processing. Further video recording processing carried out based on an automatic video recording reservation is referred to as automatically reserved video recording processing.

[Configuration of the Contents Recording/Reproducing System]

Figure 1:
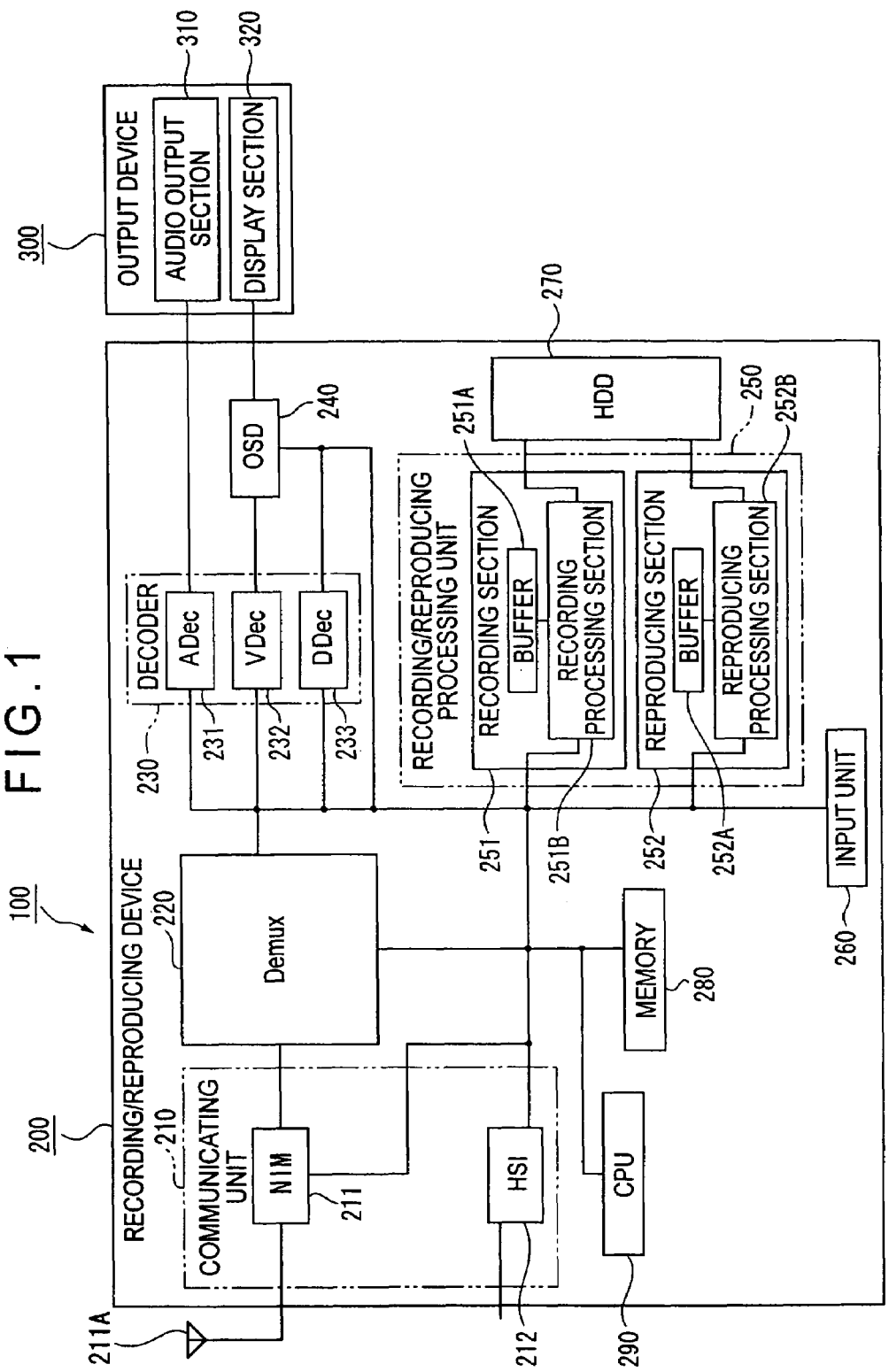
FIG. 1 is a block diagram showing general configuration of a contents recording/reproducing system according to an embodiment of the present invention.

In FIG. 1, reference numeral 100 indicates a contents recording/reproducing system (described as recording/reproducing system hereinafter), and this system records contents data which is data including audio data, video data, data broadcast data and the like for contents of, for instance, TV program and reproduces the recorded contents data. The recording/reproducing system 100 includes a recording/reproducing device 200 and an output device 300.

The output device 300 is, for instance, a personal computer, a television, a mobile telephone, a PDA (Personal Digital Assistant), or the like. The output device 300 receives contents inputted from the recording/reproducing device 200 and outputs the received contents. The output device 300 has an audio output section 310, a display section 320 and the like.

The audio output section 310 has a voice-generating unit such as a speaker (not shown). This audio output section 310 executes the processing for outputting audio data transmitted as an analog signal from the recording/reproducing device 200 as voices from the voice-generating unit. The voice-generating unit may also output TV audio data received by a TV receiver (not shown) according to necessity.

The display section 320 displays video data, data for broadcasting, EPG data, synthesized data and the like transmitted as an analog signal from the recording/reproducing device 200. The video data displayed on the display section 320 is, for instance, video of contents. Further the data for broadcasting displayed on the display section 320 is, for instance, captions for the contents or data broadcast data. The EPG data is, for instance, a program table with program names for contents, contents, and start times for broadcasting and the like described therein. The synthesized data is, for instance, synthesized video comprising content video and caption superimposed thereon, or an video displaying data broadcast data and a program table concurrently. This display section 320 is, for instance, a liquid crystal panel or an organic EL (Electro Luminescence) panel, a PDP (Plasma Display Panel), a CRT (Cathode-Ray Tube), and an FED (Field Emission Display), an electrophoresis display panel and the like. The display section 320 may display also TV video data received with a TV receiver according to necessity.

The recording/reproducing device 200 acquires and records therein contents data including audio data, video data, data broadcast data and the like distributed as TS (Transport Stream) from a broadcasting station (not shown) as a distributor and displays the received contents data on the output device 300. Further the recording/reproducing device 200 reproduces the recorded contents data according to necessity and outputs the reproduced contents data on the output device 300. The recording/reproducing device 200 further automatically deletes the recorded contents data according to necessity. The recording/reproducing device 200 includes a communicating unit 210, a demultiplexer (Demux) 220, a decoder 230, an on-screen display (OSD) 240, a recording/reproducing processing unit 250, and input unit 260, a hard disk drive (HDD) 270 as a storage unit, a memory 280, a CPU (Central Processing Unit) 290 as a computing unit, and the like.

The communicating unit 210 acquires contents data inputted from the outside or outputs the acquired contents data to the outside according to necessity. The communicating unit 210 includes a network interface module (NIM) 211, a high speed interface (HSI) 212 and the like.

An antenna 211A for receiving broadcasting waves such as those for surface wave digital broadcasting or satellite digital broadcasting is connected to the NIM 211. The NIM 211 is connected, for instance, to the Demux 220 and to the CPU 290. This NIM 211 acquires a transport stream (TS) corresponding to the contents selected by a user, for instance, from a plurality of transport streams transmitted as a digital signal from the antenna 211A under control of the CPU 290. Then the NIM 211 outputs the acquired TS to the Demux 220.

The HSI 212 is an interface enabling high speed data processing and based, for instance, on the IEEE (Institute of Electrical and Electronics Engineers) 1394 standard. Connected to this HSI 212 are the Demux 220, recording/reproducing processing unit 250, and the like. The HSI 212 acquires a TS transmitted as a digital signal from an external device (not shown in the figure) provided outside the recording/reproducing device 200 or a partial TS described hereinafter, and outputs the acquired TS to the Demux 220. Further the HSI 212 acquires a partial TS outputted from the recording/reproducing processing unit 250, processes the TS according to necessity, and transmits the TS as a digital signal to an external device (not shown in the figure) provided outside the recording/reproducing device 200.

The Demux 220 acquires a TS, separates a TS packet from the TS, and outputs the TS packet. Connected to this Demux 220 are the decoder 230, recording/reproducing processing unit 250, CPU 290, and other related sections. The Demux 220 acquires a TS from the NIM 211 or HSI 212 according to necessity under control of the CPU 290. Further the Demux 220 acquires TS packets for various data corresponding to the selected contents from this TS. More specifically, the Demux 220 acquires a TS packet with audio data incorporated therein (described as an audio packet hereinafter), a TS packet with video data incorporated therein (described as an video packet hereinafter), and a TS packet with data broadcast data or EPG data incorporated therein (described as a data packet hereinafter). The Demux 220 outputs the audio packet, video packet, and data packet acquired as described above to the decoder 230.

The EPG data includes information concerning contents such as TV programs in each TS which can be acquired with the NIM 211 described with a text format such as the BLM (Broadcasting Markup Language) or XML (extensible Markup Language). More specifically, the EPG data is based on the tabular structure in which program-related information including a plurality of sets of data-related information each relating to a program is compiled into a group of data. The program-related information has a tabular structure in which information such as a program name, start time of broadcasting, duration of the program, a channel number, description of the program such as contents of the program, a genre, a series name and the like is compiled into a group of data. The information concerning the start time of broadcasting and duration of the program functions as the guidance information and distribution time information in the present invention. Further the information concerning the program name and contents of the program functions as character information related to data in the present invention.

The Demux 220 acquires TS packets corresponding to selected contents from the acquired TS under control of the CPU 290, and reorganizes the TS packets into one TS having a form of data string, namely into a partial TS. Then the Demux 220 outputs the partial TS to the recording/reproducing processing unit 250. Further the Demux 220 acquires a partial TS from the HSI 212 or recording/reproducing processing unit 250 according to necessity under control of the CPU 290. The Demux 220 divides the partial TS into an audio packet, a video packet, and a data packet, and outputs the packets to the decoder 230.

The decoder 230 is connected to the OSD 240, CPU 290, and output device 300. This decoder 230 acquires packets from the Demux 220, and outputs various types of data incorporated in the packets to the OSD 240 or to the output device 300 according to necessity. The decoder 230 includes an audio decoder (ADec) 231, a video decoder (VDec) 232, and a data decoder (DDec) 233.

The ADec 231 is connected to the audio output section 310 of the output device 300. This ADec 231 acquires an audio packet from the Demux 220 under control of the CPU 290. Then the ADec 231 demodulates the audio data incorporated in the audio packet, and transmits the demodulated data as an analog signal to the audio output section 310 of the output device 300.

The VDec 232 is connected to the OSD 240. This VDec 232 acquires a video packet from the Demux 220 under control of the CPU 290. Then the VDec 232 demodulates the video data incorporated in the video packet, and transmits the demodulated data to the OSD 240.

The DDec 233 is connected to the OSD 240. The DDec 233 acquires a data packet from the Demux 220 under control of the CPU 290. The DDec 233 demodulates such as the data for broadcasting incorporated in the data packet or the EPG data, and outputs the demodulated data to the OSD 240. When the EPG data is incorporated in the data packet, the DDec 233 outputs the EPG data to the HDD 270 according to necessity under control of the CPU 290.

The OSD 240 is connected to such as the CPU 290 and the display section 320 of the output device 300. The OSD 240 acquires a video data from the VDec 232 according to necessity under control of the CPU 290. The OSD 240 acquires such as the data for broadcasting data or the EPG data according to necessity. The OSD 240 generates the composite data to display video based on the video data, captions based on data broadcast data, a program schedule based on the EPG data selectively superimposed or arrayed according to necessity. The composite data is transmitted to the display section 320 of the output device 300 as the analog signals. The OSD 240 outputs the video data, the data for broadcasting data, the EPG data individually according to necessity as the analog signals to the display section 320.

The recording/reproducing processing unit 250 is connected to such as the HDD 270, the CPU 290. The recording/reproducing processing unit 250 acquires the partial TS from the Demux 220 according to necessity and then records the partial TS in the HDD 270. The recording/reproducing processing unit 250 acquires the partial TS recorded to the HDD 270 according to necessity and then outputs the partial TS to the HSI 212 or the Demux 220. The recording/reproducing processing unit 250 includes the recording section 251 as means for acquiring data and the reproducing section 252.

The recording section 251 records the partial TS from the Demux 220 to the HDD 270. The recording section 251 includes the buffer 251A, the recording processing section 251B, and the like. The buffer 251A temporarily records the partial TS from the Demux 220. The recording processing section 251B acquires the partial TS from the Demux 220 under control of the CPU 290, and readably records the partial TS to the buffer 251A according to necessity. The recording processing section 251B reads out the partial TS recorded to the buffer 251A according to necessity, and outputs the partial TS to the HDD 270.

The reproducing section 252 outputs to the partial TS recorded in the HDD 270 to the HSI 212 or the Demux 220 according to necessity. The reproducing section 252 includes the buffer 252A, the reproducing processing section 252B and the like. The buffer 252A temporarily records the partial TS from the HDD 270. The reproducing processing section 252B acquires the partial TS from the HDD 270 under control of the CPU 290, and readably records the partial TS to the buffer 252A according to necessity. The reproducing processing section 252B reads out the partial TS recorded in the buffer 252A according to necessity, and outputs the partial TS to the HSI 212 or the Demux 220.

The input unit 260 is connected to the CPU 290 and the like. The input unit 260 includes various operation buttons or operation switches (not shown) input-operably equipped in front of a case and the like (not shown). The content of input operation by using the operation buttons or operation switches is set up matters including a set up for the content of operation of the recording/reproducing device 200 for instance. Specifically, the set up for the recording/reproducing of the content and the set up for the TS received by the NIM 212 (translator's comment: correctly, 211) can be illustrated as an example. The input unit 260 transmits and sets up various information as operation signals to the CPU 290 by input operation of the set up matters. The input unit 260 may include a remote controller light sensing section receiving various information transmitted through infrared rays from a remote controller (not shown) and transmitting the various information to the CPU 290 as operation signals.

The HDD 270 is connected to the CPU 290 for instance. The HDD 270 is controlled by an ATA (AT Attachment) Interface. In this specification, it will be illustrated by an example that the configuration in which the HDD 270 is controlled by the ATA Interface, but the configuration in which HDD 270 is controlled by an IDE (Integrated Drive Electronics) Interface or a SCSI (Small Computer System Interface) may be possible. The HDD 270 readably records the partial TS of the contents inputted from the recording section 251, namely the contents data according to necessity. The HDD 270 readably records, for instance, the latest EPG data acquired at the NIM 211 according to necessity. Instead of HDD 270, the configuration may include a drive or a driver readably storing various information in the storage medium such as a DVD (Digital Versatile Disc), an optical disc or a memory card.

A memory 280 readably records various data necessary for acquiring and recording the desired contents data from the TS outputted from the NIM 211 or for reproducing the recorded contents data according to necessity. The memory 280 readably records specific keyword information (not shown) and video recording reservation list information 500 illustrated in FIG. 2 according to necessity.

The specific keyword information is information on at least one keyword identified or related to a content of program name according to user's particular preference for instance. According to necessity, a keyword stated in the specific keyword information is referred to as a specific keyword and will be described below. The specific keyword information can be changed by a user according to necessity.

The video recording reservation list information 500 is information on a manually reserved video recording list and an automatically reserved video recording list. The video recording reservation list information 500 includes reservation number information 510 and at least one reservation information 520, and those of which are associated to one data structure.

The reservation number information 510 is information on the total number n of the reservation information 520. It will be described in the below that the total number n is referred to as reservation information number n. The reservation information number n is added by 1 when addition of manual video recording reservation or automatic video recording reservation by the CPU 290 is set, and deducted by 1 when recording based on manual video recording reservation or automatic video recording reservation is finished.

The reservation information 520 is information on manually video recording reservation or automatic video recording reservation. The reservation information 520 is new manual reservation information or new automatic reservation information generated by the CPU 290 as will be described later. The reservation information 520, by the CPU 290, is incorporated in the video recording reservation list information 500 when setting up the manual video recording reservation or the automatic video recording reservation, and is deleted from the video recording reservation list information 500 when the video recording is ended based on the manually reserved video recording or the automatic reserved video recording. The reservation information 520 includes the basic video recording information 521, automatic video recording reservation flag 522, priority information 523 and a flag 524 for comparing priority, and those of which are associated with one data structure. The reservation information 520 may include the basic video recording information 521, automatic video recording reservation flag 522 and priority information 523, and those of which are associated to one data structure.

The basic video recording information 521 is necessary information for executing manually reserved video recording or the automatic reserved video recording. Specifically, the basic video recording information 521 includes information for starting date and time of video recording, information for ending date and time of video recording and channel information, and those of which are associated with one data structure. The basic video recording information 521 can be changed by the CPU 290 according to necessity.

The automatic video recording reservation flag 522 is flag information indicating whether the video recording based on the basic video recording information 521 is the automatically reserved video recording or not. Specifically, when the automatic video recording reservation flag 522 is "0", it indicates the video recording is manual video recording reservation, not the automatic video recording reservation, and when "1", it indicates the automatic video recording reservation.

The priority information 523 is information on the priority of video recording based on the basic video recording information 521. The priority information 523 indicates information indicating as "high", "intermediate" or "low" of the priority as the data. Specifically, when the priority information 523 is "high", it indicates the priority is the highest, when "intermediate", it indicates the priority is lower than "high", and when "low", it indicates the priority is the lowest. In this specification, it is described that the priority is indicated as "high", "intermediate" or "low", but it is not limited thereto. The priority may be indicated using the numeric value such as "3", "2" or "1". Further, it is described that the priority has three stages in this specification, but it is not limited to. The priority may be indicated as other number of stages such as four stages or ten stages according to necessity.

The flag 524 for comparing priority is incorporated when a video recording based on the basic video recording information 521 is the automatically reserved video recording, and not incorporated when the manually reserved video recording. This flag 524 for comparing priority is flag information indicating whether the basic video recording information 521 is generated based on the specific keyword from the specific keyword information or not. Specifically, when the flag 524 for comparing priority is "0", the basic video recording information 521 is not generated, and when the flag 524 for comparing priority is "1", the basic video recording information 521 is generated.

Further, the memory 280 readably stores many kinds of programs developed on the OS (operating system) controlling the whole recording/reproducing device 200 according to necessity. As the memory 280, it is desirable to use a memory capable of keeping memory in case of abrupt shut down of electrical source such as CMOS (Complementary Metal-Oxide Semiconductor) memory. Besides, the memory 280 may include a drive or a driver readably stored in the storage medium such as an HD, a DVD or an optical disk.

Figure 3:
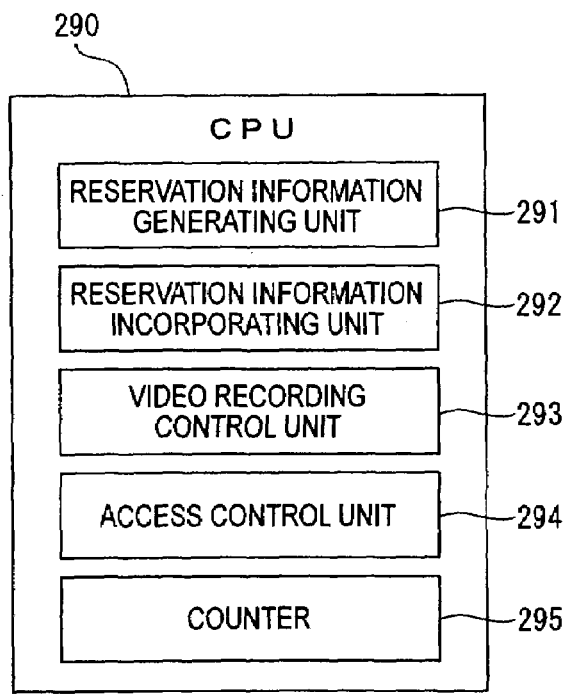
FIG. 3 is a schematic view showing general configuration of a CPU constituting the recording/reproducing device according to the embodiment.

The CPU 290 includes many kinds of programs such as a reservation information generating unit 291 also working as a demand information acquiring unit, a guidance information acquiring unit and a priority information acquiring unit, a reservation information incorporating unit 292 also working as a comparing unit and a acquiring control unit, a video recording control unit 293 working as a data storing control unit, an access control unit 294 and a counter 295, as illustrated in FIG. 3. And the processing controller according to the present invention includes the reservation information generating unit 291 and the reservation information incorporating unit 292. And also the data processor according to the present invention includes a recording section 251, a reservation information generating unit 291, the reservation information incorporating unit 292 and the video recording control unit 293.

Figure 2:
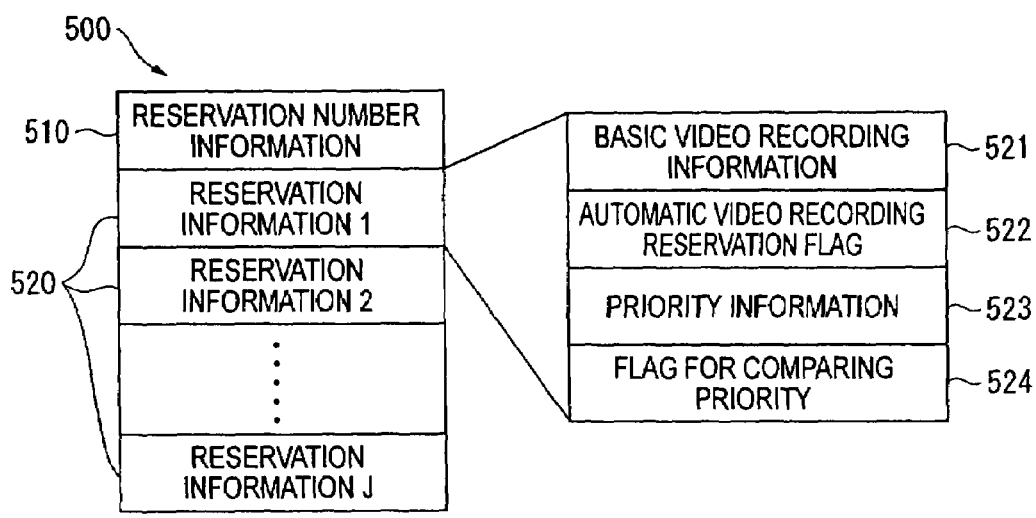
FIG. 2 is a schematic view showing general configuration of video recording reservation list information in the embodiment.

The counter 295 counts numbers corresponding to the reservation information 520 referred to setting of the automatic video recording reservation flag 522 by the reservation information incorporating unit 292 when new automatic reservation information and new manual reservation information are incorporated in the video recording reservation list information 500 as the reservation information 520 under control of the reservation information generating unit 291. In this specification, the numbers corresponding to the reservation information 520 are as follows; as illustrated in FIG. 2, a number corresponding to the reservation information 520 of "Reservation information 1" is 1, a number corresponding to the reservation information 520 of "Reservation information 2" is 2, and a number corresponding to the reservation information 520 of "Reservation information J (J is natural number)" is J, for instance.

The reservation information generating unit 291 acquires the automatic video recording reservation request information sent from the input unit 260 as operation signals according to necessity. And new automatic reservation information is generated based on the automatic video recording reservation request information. Specifically, the reservation information generating unit 291 controls the DDec 233 and stores the EPG data described in the TS acquired at the NIM 211 to the HDD 270. And when the reservation information generating unit 291 acquires the automatic video recording reservation request information, the reservation information generating unit 291 recognizes the keywords described in the automatic video recording reservation request information and acquires the EPG data stored in the HDD 270. Further, the reservation information generating unit 291 retrieves from the EPG data, the content of the program information such as a program name, a program description, a genre, a name of series identified or concerned to the recognized keywords.

And the reservation information generating unit 291 recognizes the content of the program information such as the program starting date and time, a length of the program, a channel number of the program. And then, the reservation information generating unit 291 generates video recording program starting date and time information and the video recording ending date and time information based on the information concerning program starting date and time and the length of the program. Then, the reservation information generating unit 291 generates the basic information of video recording describing such as the video recording starting date and time, the video recording ending date and time, and channel information. Also, the reservation information generating unit 291 generates the flag information "1" indicating that the video recording based on the basic video recording information 521 is the automatic video recording reservation process. Then, the automatic video recording reservation flag 522 incorporating the flag information is generated. In addition, the reservation information generating unit 291 generates automatic reservation priority setting information that is priority information indicating "intermediate" having been preset priority. The reservation information generating unit 291 generates the priority information 523 incorporating the automatic reservation priority setting information. Also, the reservation information generating unit 291 retrieves a specific keyword described in the particular keyword information, and determines whether the keyword described in the automatic video recording reservation request information is a specific keyword or not. And if determined that the keyword is specific, the flag information "1" is generated, and if determined that the keyword is not specific, the flag information "0" is generated. Then, the flag 524 for comparing priority incorporating this flag information is generated. Further, the reservation information generating unit 291 generates new automatic reservation information incorporating the basic video recording information 521, the automatic video recording reservation flag 522, the priority information 523 and the flag 524 for comparing priority. Then the reservation information generating unit 291 generates a plurality of new automatic reservation information each corresponding to the retrieved content individually when recognizes a plurality of retrievals of the content associated with keyword, for instance.

Further, the reservation information generating unit 291 acquires manual video recording reservation request information which is request information sent from the input unit 260 as operation signals according to necessity. The reservation information generating unit 291 generates new manual reservation information based on this manual video recording reservation request information. Specifically, the reservation information generating unit 291, when acquiring new manual video recording reservation request information, recognizes the video recording setting basic information described in this manual video recording reservation request information such as video recording starting date and time, video recording ending date and time and channel information, and generates the basic video recording information 521 describing those various information. And the reservation information generating unit 291 generates the flag information of "0" indicating that the video recording based on the basic video recording information 521 is the manual reserved video recording, and generates the automatic video recording reservation flag 522 incorporating this flag information. In addition, the reservation information generating unit 291 recognizes, based on the manual reservation priority setting information which is the priority information described in the manual video recording reservation request information, that priority set by a user is either one of "high", "intermediate" or "low". Then, the reservation information generating unit 291 generates the priority information 523 indicating this recognized priority. Further, the reservation information generating unit 291 generates new manual reservation information incorporating the basic video recording information 521, the automatic video recording reservation flag 522, and the priority information 523.

The reservation information incorporating unit 292 incorporates new automatic reservation information and new manual reservation information into the video recording reservation list information 500 as the reservation information 520 according to necessity. Specifically, when the reservation information incorporating unit 292 recognizes generation of new automatic reservation information on the reservation information generating unit 291, the reservation information incorporating unit 292 checks a counter value [i] (i is natural number) on the counter 295, and recognizes setting of the automatic video recording reservation flag 522 incorporated into "reservation information i", and then determines whether this reservation information 520 is information corresponding to the manual video recording or not, based on the setting of the automatic video recording reservation flag 522. When the reservation information incorporating unit 292 recognizes that reservation information 520 is corresponding to the manual video recording reservation, the reservation information incorporation unit 292 determines whether at least a part of the video recording time for the new automatic reservation information overlaps with that of the basic video recording information 521 of the reservation information 520 or not, based on the new automatic reservation information and the basic video recording information 521 of the reservation information 520. Namely, the reservation information incorporating unit 292 determines whether the new automatic reservation information overlaps with the reservation information 520 or not. In addition, when the reservation information incorporating unit 292 determines that the new automatic reservation information overlaps with the reservation information 520, the reservation information incorporating unit 292 recognizes the priority between the two based on the new automatic reservation information and the priority information 523 of the reservation information 520.

When the reservation information incorporating unit 292 determines that priority of new automatic reservation information is higher than that of the reservation information 520, the reservation information incorporating unit 292 deletes the reservation information 520 from the video recording reservation list information 500, and incorporates the new automatic reservation information as the reservation information 520 in the video recording reservation list information 500. When the reservation information incorporating unit 292 determines that priority of the reservation information 520 is higher than that of the new automatic reservation information, the reservation information incorporating unit 292 does not incorporate the new automatic reservation information in the video recording reservation list information 500. Further when the reservation information incorporating unit 292 determines that priority of the new automatic reservation information is at the same level as that of the reservation information 520, the reservation information incorporating unit 292 checks whether a flag 524 for comparing priority of new automatic reservation information has been set or not. When the reservation information incorporating unit 292 determines that the flag 524 for comparing priority of new automatic reservation information has been set in "1", namely that the new automatic reservation information has been generated based on a particular keyword set by the user, the reservation information incorporating unit 292 deletes the reservation information 520 from the video recording reservation list information 500, and incorporates the new automatic reservation information as the reservation information 520 in the video recording reservation list information 500. When the reservation information incorporating unit 292 determines that the flag 524 for comparing priority of new automatic reservation information has been set in "0", namely that the new automatic reservation information has not been generated based on a particular keyword set by the user, the reservation information incorporating unit 292 does not incorporate the new automatic reservation information in the video recording reservation list information 500.

Further when the reservation information incorporating unit 292 determines that any of the reservation information 520 incorporated in the video recording reservation list information 500 does not overlap with the new automatic reservation information, the reservation information incorporating unit 292 incorporates the new automatic reservation information in the video recording reservation list information 500. Then the reservation information incorporating unit 292 increments the number n of reservation information in reservation number information 510 in the video recording reservation list information 500 by 1.

When the reservation information incorporating unit 292 recognizes that new automatic reservation information has been generated by the reservation information generating unit 291, the reservation information incorporating unit 292 checks a counter value i on a counter 295, and also checks the setting state of an automatic video recording reservation flag 522 incorporated in the reservation information 520 corresponding to the i-th reservation information. When the reservation information incorporating unit 292 determines, based on the setting state of the automatic video recording reservation flag 522, that the reservation information 520 is information corresponding to an automatic video recording reservation, the reservation information incorporating unit 292 determines, based on the new manual reservation information and the basic video recording information 521 in the reservation information 520, whether the new manual reservation information overlaps with the reservation information 520 or not. Further, when the reservation information incorporating unit 292 determines that the new automatic reservation information overlaps with the reservation information 520, the reservation information incorporating unit 292 compares the priorities of the two types of information.

When the reservation information incorporating unit 292 determines that priority of the new manual reservation information is higher than that of the reservation information 520, the reservation information incorporating unit 292 deletes the reservation information 520 from the video recording reservation list information 500, and incorporates the new manual reservation information as reservation information 520 in the video recording reservation list information 500. When the reservation information incorporating unit 292 determines that priority of the reservation information 520 is higher than that of the new automatic reservation information, the reservation information incorporating unit 292 does not incorporate the new automatic reservation information in the video recording reservation list information 500. Further when the reservation information incorporating unit 292 determines that priority of the new manual reservation information is at the same level as that of the reservation information 520, the reservation information incorporating unit 292 checks the setting state of the flag 524 for comparing priority. When the reservation information incorporating unit 292 determines that the reservation information 520 has not been generated by a particular keyword set by a user, the reservation information incorporating unit 292 deletes the reservation information 520 from the video recording reservation list information 500, and incorporates the new manual reservation information as reservation information 520 in the video recording reservation list information 500. Further, when the reservation information incorporating unit 292 determines that the reservation information 520 has been generated by a particular keyword, the reservation information incorporating unit 292 does not incorporate the new manual reservation information in the video recording reservation list information 500.

Further when the reservation information incorporating unit 292 determines that any of the reservation information 520 incorporated in the video recording reservation list information 500 does not overlap with the new manual reservation information, the reservation information incorporating unit 292 incorporates the new manual reservation information in the video recording reservation list information 500. Then the reservation information incorporating unit 292 increments the number n of reservation information in the reservation number information 510 in the video recording reservation list information 500 by 1.

A video recording control unit 293 executes the manually reserved video recording processing or automatically reserved video recording processing based on the reservation information 520 in the video recording reservation list information 500. More specifically, the video recording control unit 293 checks the current time by acquiring time information for a clocking unit (not shown) according to necessity. Further the video recording control unit 293 recognizes the time for starting reserved video recording corresponding to each reservation information 520 based on the basic video recording information 521 in each reservation information 520 incorporated in the video recording reservation list information 500. When the video recording control unit 293 recognizes that video recording corresponding to any of reservation information 520 should be started at the current point of time, the video recording control unit 293 recognizes a channel number for the contents to be recorded based on the basic video recording information 521 in this reservation information 520. Further the video recording control unit 293 controls the NIM 211 to acquire a TS corresponding to the channel number. Further the video recording control unit 293 controls the Demux 220 to generate a partial TS for the contents to be recorded from the TS acquired by the NIM 211. Then the video recording control unit 293 controls the recording section 251 to record the partial TS in the HDD 270. Namely the video recording control unit 293 starts recording of the contents.

The video recording control unit 293 recognizes the finish time for recording of the contents based on the basic video recording information 521 in the reservation information 520. When the video recording control unit 293 recognizes that the current time is the finish time for recording the contents, the video recording control unit 293 controls the NIM 211, Demux 220, and recording section 251 to finish recording of the contents. Further the video recording control unit 293 gives a specific number to the recorded contents. In addition, the video recording control unit 293 deletes the reservation information 520 from the video recording reservation list information 500, and decrements the reservation information number n in the reservation number information 510 by 1.

Further the video recording control unit 293 acquires video recording start information transmitted as an operation-related signal from the input unit 260 according to necessity. Further the video recording control unit 293 acquires information concerning a channel number or the like described in the video recording start information. The video recording control unit 293 controls the NIM 211, Demux 220, and recording section 251 like in manually reserved video recording or in automatically reserved video recording, to start recording of the contents. The video recording control unit 293 acquires video recording end information transmitted as an operation-related signal from the input unit 260 according to necessity. Further the video recording control unit 293 controls the NIM 211, Demux 220, and recording section 251 to finish recording of the contents, and gives a specific number to the recorded contents.

The access control unit 294 executes reproduction of contents recorded in the HDD 270 based on various information transmitted as an operation-related signal from the input unit 260. More specifically, the access control unit 294 acquires reproduction request information transmitted from the input unit 260 as an operation-related signal, and recognizes the request for reproduction of the contents based on this reproduction request information. Further, when the access control unit 294 acquires contents identifying information from the input unit 260, the access control unit 294 recognizes the number identifying the contents based on this contents identifying information. The access control unit 294 controls the reproducing section 252 so that a partial TS for the contents with the identifying number assigned thereto is searched and acquired from the HDD 270. Further the access control unit 294 controls the Demux 220 to acquire an audio packet, an video packet and a data packet from the partial TS acquired in the reproducing section 252. Further the access control unit 294 outputs the audio packet to the ADec 231, the video packet to the VDec 232, and the data packet to the DDec 233 respectively according to necessity. Further the access control unit 294 controls the decoder 230 and OSD 240 to output contents data such as audio data, video data, and data broadcast data to the output device 300.

The access control unit 294 acquires fast forward information or rewind information transmitted as an operation-related signal from the input unit 260. Then the access control unit 294 executes fast forwarding or rewinding of the contents being reproduced based on this fast forward information or rewind information.

Further, when the access control unit 294 acquires edit request information transmitted as an operation-related signal from the input unit 260, the access control unit 294 recognizes the result for edition of the contents based on this edit request information. Further the access control unit 294 recognizes a number identifying the contents based on contents identifying information from the input unit 260. Then the access control unit 294 controls the reproducing section 252, Demux 220, decoder 230, OSD 240, recording section 251 and other related section according to necessity to edit contents data for the contents requested to be edited.

The access control unit 294 acquires access end information transmitted as an operation-related signal from the input unit 260. Then the access control unit 294 controls the Demux 220, decoder 230, OSD 240, recording/reproducing processing unit 250 and other related sections according to necessity to finish the processing for reproducing or editing the contents.

[Operations of the Contents Recording/Reproducing System]

Next, descriptions are provided for operations of the recording/reproducing system 100 with reference to the related drawings.

(Processing for Generating New Automatic Reservation Information)

Figure 4:
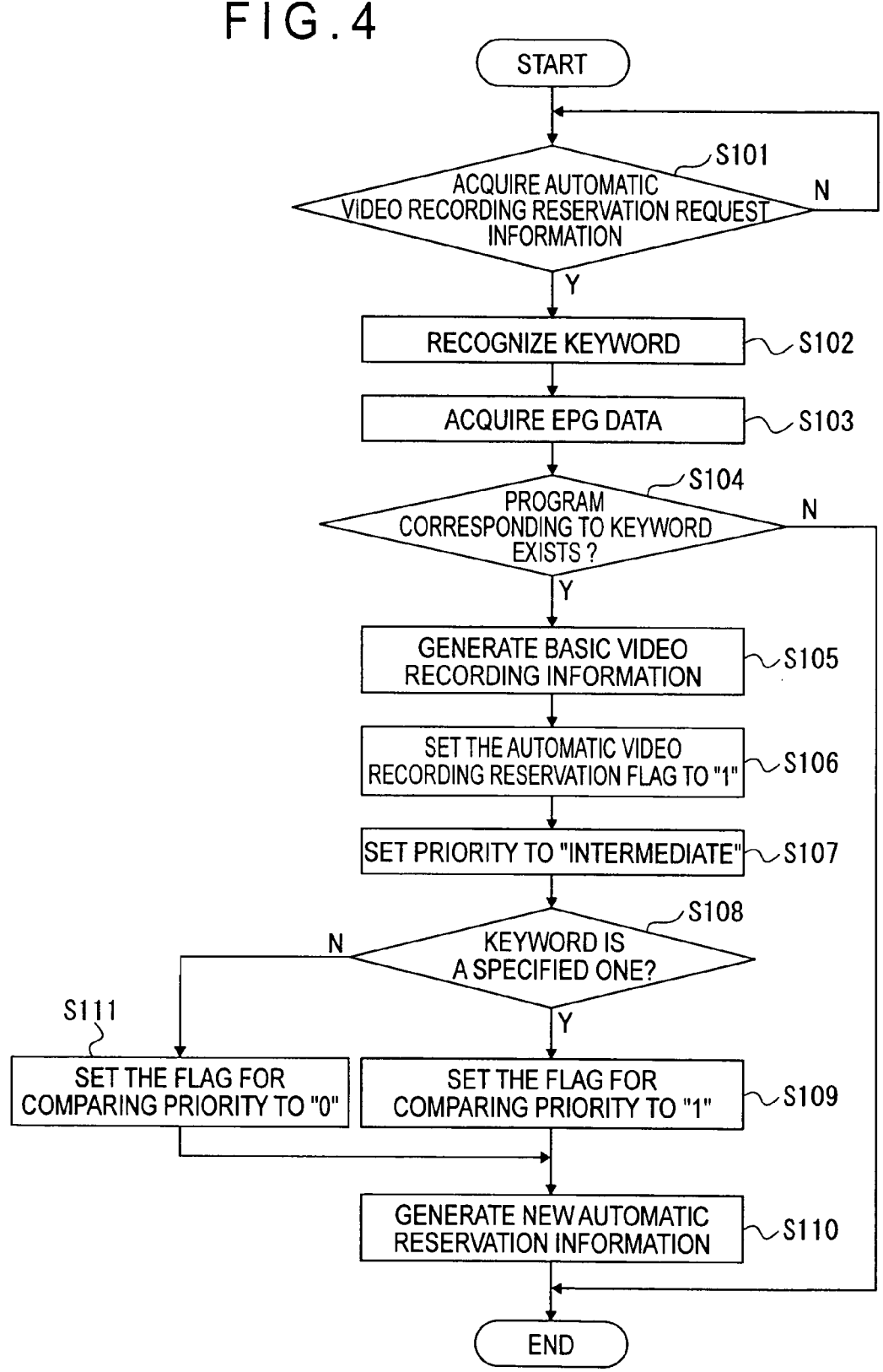
FIG. 4 is a flow chart illustrating a process of generating new automatic reservation information in the embodiment.

At first, the processing for generating new automatic reservation information is described below as an operation executed by the recording/reproducing system 100 with reference to FIG. 4.

At first, a user inputs automatic video recording reservation request information concerning a program name of desired contents or a keyword related to contents of the program by operating the input unit 260 for setting. When the recording/reproducing device 200 acquires the automatic video recording reservation request information as shown in FIG. 4, with the reservation information generating unit 291 in the CPU 290 (step S101), the recording/reproducing device 200 recognizes, for instance, the keyword described in this automatic video recording reservation request information (step S102). Further the recording/reproducing device 200 acquires the EPG data acquired by the NIM 211 and stored in the HDD 270 (step S103). Then the recording/reproducing device 200 determines whether there is a program corresponding to the keyword set by the user or not (step S104). More specifically, the recording/reproducing device 200 determines whether program-related information concerning the contents such as a program name matching or relating to the keyword, descriptions of the program, a category of the contents, and a series name has been retrieved from the EPG data or not.

In this step S104, when the reservation information generating unit 291 determines that there is no program corresponding to the keyword, the reservation information generating unit 291 terminates the processing for generating new automatic reservation information. When the reservation information generating unit 291 determines in step S104 that there is a program corresponding to the keyword, the reservation information generating unit 291 recognizes various information such as start date and time for broadcasting of the contents, length of the program, a channel number and the like based on the EPG data. Then the reservation information generating unit 291 generates the basic video recording information 521 including the video recording start date and time information, recording end date and time information, channel information and the like (step S105). Further the reservation information generating unit 291 generates the automatic video recording reservation flag 522 with flag information set in "1" incorporated therein (step S106). Further the reservation information generating unit 291 generates priority information 523 with automatic reservation priority set information having the priority set in "intermediate" incorporated therein (step S107). Further the reservation information generating unit 291 determines based on the specified keyword information set by the user and stored in the memory 280 whether the keyword described in the automatic video recording reservation request information is a specified keyword or not (step S108).

In this step S108, when the reservation information generating unit 291 determines that the keyword described in the automatic video recording reservation request information is a specified keyword, the reservation information generating unit 291 generates the flag 524 for comparing priority with the flag information set in "1" incorporated therein (step S109). Then the reservation information generating unit 291 generates the new automatic reservation information with the basic video recording information 521, automatic video recording reservation flag 522, priority information 523, and flag 524 for comparing priority incorporated therein (step S110), and terminates the processing for generating the new automatic reservation information. On the other hand, when the reservation information generating unit 291 determines in step S108 that the keyword described in the automatic video recording reservation request information is not a specified keyword, the reservation information generating unit 291 generates the flag 524 for comparing priority with the flag information set in "0" incorporated therein (step S111). Then the reservation information generating unit 291 executes the processing in step S110 and terminates the processing for generating the new automatic reservation information.

(Processing for Incorporating the New Automatic Reservation Information)

Figure 5:
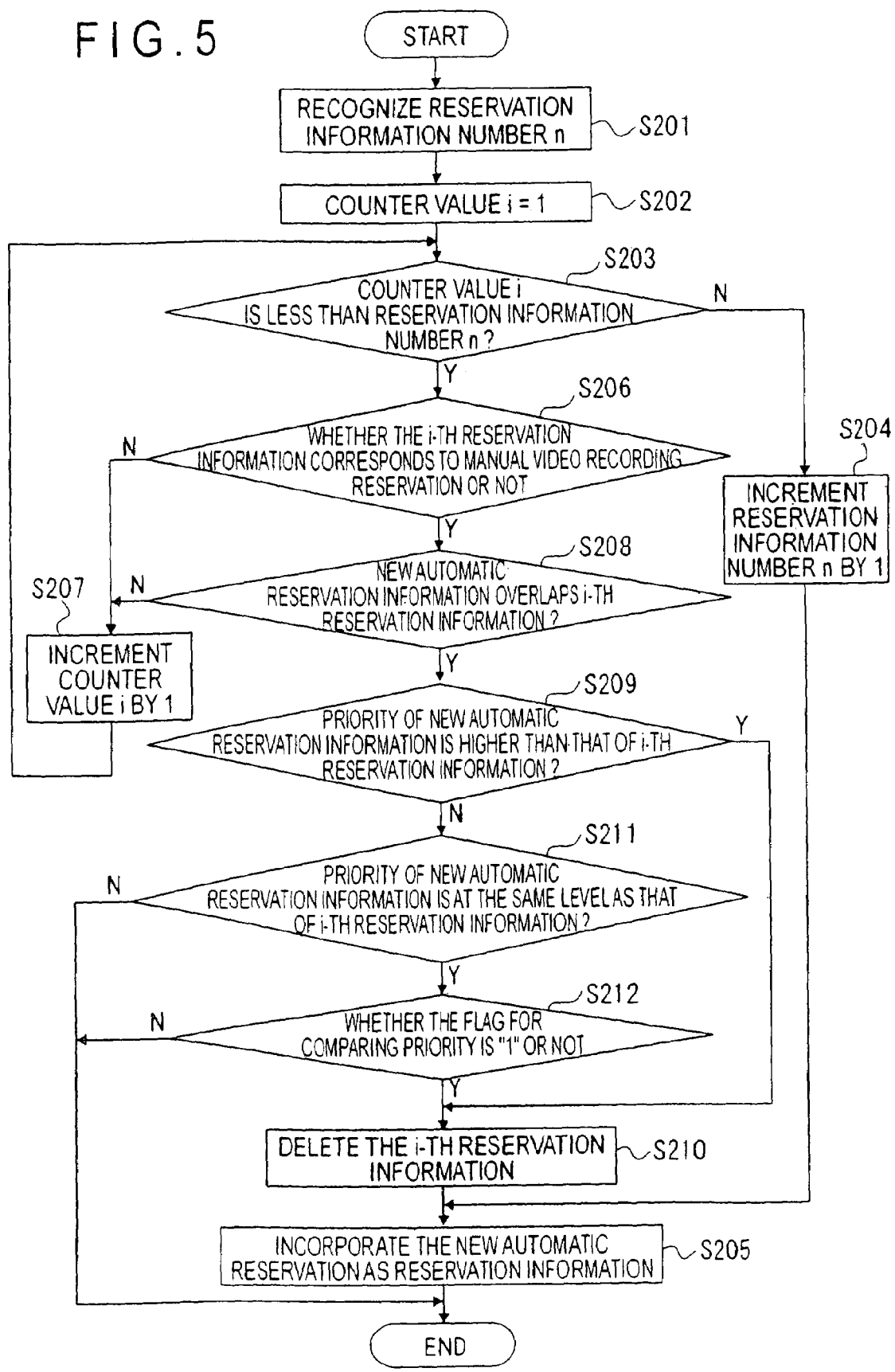
FIG. 5 is a flow chart illustrating a process of incorporating new automatic reservation information in the embodiment.

Next descriptions are provided for the processing for incorporating the new automatic reservation information as an operation executed by the recording/reproducing system 100 with reference to FIG. 5.

The reservation information generating unit 291 in the recording/reproducing device 200 executes the processing for generating new automatic reservation information, and then recognizes the reservation information number n based on the reservation number information 510 in the video recording reservation list information 500 (step S201). Then the reservation information generating unit 291 sets the counter number i on the counter 295 to "1" (step S202). Then the reservation information generating unit 291 determines whether the counter value i is equal to the reservation information number n or below or not (step S203).

In this step S203, when the reservation information generating unit 291 determines that the counter value i is more than the reservation information number n, the reservation information generating unit 291 increments the reservation information number by 1 (step S204). Then the reservation information generating unit 291 incorporates the new automatic reservation information as reservation information 520 in the video recording reservation list information 500 (step S205). Then the reservation information generating unit 291 terminates the processing for incorporating the new automatic reservation information. On the other hand, when the reservation information generating unit 291 determines in step S203 that the counter value i is not more than the reservation information number n, the reservation information generating unit 291 determines based on the automatic video recording reservation flag 522 in the i-th reservation information 520 whether the reservation information 520 corresponds to the manual video recording reservation or not (step S206).

When the reservation information generating unit 291 determines in step S206 that the reservation information 520 does not correspond to the manual video recording reservation, the reservation information generating unit 291 increments the counter value i by 1 (step S207), and returns to step S203. On the other hand, when the reservation information generating unit 291 determines in step S206 that the reservation information 520 corresponds to the manual video recording reservation, the reservation information generating unit 291 determines based on this reservation information 520 and the basic video recording information 521 in the new automatic reservation information whether the new automatic reservation information overlaps with the reservation information 520 or not (step S208). When the reservation information generating unit 291 determines in this step S208 that the new automatic reservation information does not overlap with the reservation information 520, the reservation information generating unit 291 executes the processing in step S207. On the other hand, when the reservation information generating unit 291 determines in step S208 that the reservation information 520 overlaps with the new automatic reservation information, the reservation information generating unit 291 determines based on the reservation information 520 and priority information 523 in the new automatic reservation information whether priority of the new automatic reservation information is higher than that of the reservation information 520 or not (step S209). More specifically, as priority of the new automatic reservation information is previously set to "intermediate", the reservation information generating unit 291 determines whether priority of the reservation information 520 is "low" or not.

When the reservation information generating unit 291 determines in this step S209 that priority of the new automatic reservation information is higher than that of the reservation information 520, the reservation information generating unit 291 deletes this reservation information 520 from the video recording reservation list information 500 (step S210), and execute the processing in step S205. On the other hand, when the reservation information generating unit 291 determines in step S209 that priority of the new automatic reservation information is not higher than that of the reservation information 520, the reservation information generating unit 291 determines whether priority of the new automatic reservation information is at the same level as that of the reservation information 520 or not (step S211). More specifically, the reservation information generating unit 291 determines whether priority of the reservation information 520 is "intermediate" or not. When the reservation information generating unit 291 determines that priority of the new automatic reservation information is not at the same level as that of the reservation information 520 and priority of the new automatic reservation information is lower than that of the reservation information 520, namely that priority of the reservation information 520 is "high", the reservation information generating unit 291 does not incorporate the new automatic reservation information in the video recording reservation list information 500 and terminates the processing. When the reservation information generating unit 291 determines in step S211 that priority of the new automatic reservation information is at the same level as that of the reservation information 520, the reservation information generating unit 291 determines whether the flag 524 for comparing priority in this new automatic reservation information has been set to "1" or not (step S212).

When the reservation information generating unit 291 determines in step S212 that the flag 524 for comparing priority has been set to "1", namely that the new automatic reservation information has been generated based on a specified keyword, the reservation information generating unit 291 executes the processing in step S210. On the other hand, when the reservation information generating unit 291 determines in step S212 that the flag 524 for comparing priority has been set to "0", namely that the new automatic reservation information has not been generated based on a specified keyword, the reservation information generating unit 291 does not incorporate the new automatic reservation information in the video recording reservation list information 500 and terminates the processing.

(Processing for Incorporating the New Automatic Reservation Information)

Descriptions are provided below for the processing for incorporating new automatic reservation information as an operation executed by the recording/reproducing system 100.

At first, a user inputs, for setting, various types of information for manually reserving recording of desired contents such as, for instance, basic video recording setting information and manual video recording reservation request information including manual reservation priority setting information. The recording/reproducing device 200 acquires the manual video recording reservation request information with the reservation information generating unit 291 as shown in FIG. 6 (step S301), the recording/reproducing device 200 recognizes the various information such as video recording start date and time information, video recording finish date and time information, channel information and the like included in the basic video recording setting information described in the manual video recording reservation request information. Then the recording/reproducing device 200 generates the basic video recording information 521 including the various types of information (step S302). Further the reservation information generating unit 291 generates the automatic video recording reservation flag 522 with the flag information set to "0" incorporated therein (step S303). Further the reservation information generating unit 291 generates, based on the manual reservation priority setting information described in the manual video recording reservation request information, priority information 523 indicating to which of "high", "intermediate", and "low" priority of the manual video recording reservation has been set (step S304). Then the reservation information generating unit 291 generates new manual reservation information with the basic video recording information 521, automatic video recording reservation flag 522, and priority information 523 incorporated therein (step S305), and terminates the processing for generating new manual reservation information.

(Processing for Incorporating New Manual Reservation Information)

Descriptions are provided below for the processing for incorporating new manual reservation information as an operation executed by the recording/reproducing system 100 with reference to FIG. 7.

The reservation information generating unit 291 in the recording/reproducing device 200 executes the processing for generating new manual reservation information and recognizes the reservation information number n (step S401), and sets the counter value i on the counter 295 to 1 (step S402). Then the reservation information generating unit 291 determines whether the counter value i is not more than the reservation information number n or not (step S403).

When the reservation information generating unit 291 determines in this step S403 that the counter value i is more than the reservation information number n, the reservation information generating unit 291 increments the reservation information number n by 1 (step S404). Then the reservation information generating unit 291 incorporates the new manual reservation information as the reservation information 520 in the video recording reservation list information 500 (step S405), and terminates the processing for incorporating the new manual reservation information. On the other hand, when the reservation information generating unit 291 determines in step S403 that the counter value i is not more than the reservation information number n, the reservation information generating unit 291 determines whether the n-th reservation information 520 corresponds to the automatic video recording reservation or not (step S406).

In this step S406, when the reservation information generating unit 291 determines that the reservation information 520 does not correspond to the automatic video recording reservation, the reservation information generating unit 291 increments the counter value i by 1 (step S407), and returns to step S403. On the other hand, when the reservation information generating unit 291 determines in step S406 that the reservation information 520 corresponds to the automatic video recording reservation, the reservation information generating unit 291 determines whether the new manual reservation information overlaps with the reservation information 520 or not (step S408). When the reservation information generating unit 291 determines in this step S408 that the new manual reservation information does not overlap with the reservation information 520, the reservation information generating unit 291 executes the processing in step S407. On the other hand, when the reservation information generating unit 291 determines in step S408 that the new manual reservation information overlaps with the reservation information 520, the reservation information generating unit 291 determines whether priority of the new manual reservation information is higher than that of the reservation information 520 or not (step S409). More specifically, as priority of the reservation information 520 corresponding to the automatic video recording reservation is previously set to "intermediate", the reservation information generating unit 291 determines whether priority of the new manual reservation information is "high" or not.

In this step S409, when the reservation information generating unit 291 determines that priority of the new manual reservation information is higher than that of the reservation information 520, the reservation information generating unit 291 deletes the reservation information 520 from the video recording reservation list information 500 (step S410), and executes the processing in step S405. When the reservation information generating unit 291 determines in step S409 that priority of the new manual reservation information is not higher than that of the reservation information 520, the reservation information generating unit 291 determines whether priority of the new manual reservation information is at the same level as that of the reservation information 520 or not (step S411). More specifically, the reservation information generating unit 291 determines whether priority of the new manual reservation information is "intermediate" or not. When the reservation information generating unit 291 determines in this step S411 that priority of the new manual reservation information is not at the same level as that of the reservation information 520 and priority of the new manual reservation information is higher than that of the reservation information 520, namely priority of the new manual reservation information is "low", the reservation information generating unit 291 does not incorporate the new manual reservation information in the video recording reservation list information 500 and terminates the processing. When the reservation information generating unit 291 determines in step S411 that priority of the new manual reservation information is at the same level as that of the reservation information 520, the reservation information generating unit 291 checks the setting state of the flag 524 for comparing priority incorporated in the reservation information 520 (step S412). Then the reservation information generating unit 291 determines whether the flag 524 for comparing priority in this reservation information 520 has been set to "1" or not (step S413).

When the reservation information generating unit 291 determines in step S413 that the flag 524 for comparing priority has been set to "1", namely that the reservation information 520 has been generated based on a specified keyword, the reservation information generating unit 291 does not incorporate the new manual reservation information in the video recording reservation list information 500, and terminates the processing. On the other hand, when the reservation information generating unit 291 determines in step S412 that the flag 524 for comparing priority has been set to "0", namely that the reservation information 520 has not been generated based on a specified keyword, the reservation information generating unit 291 executes the processing in step S410.

[Effects of the Contents Recording/Reproducing System]

As described above, in the embodiment, the CPU 290 of the recording/reproducing device 200 acquires manual video recording reservation request information with the reservation information generating unit 291, and generates priority information 523 indicating which of "high", "intermediate", and "low" the priority is set by the user based on the manual reservation priority setting information in the manual video recording reservation request information. Then the recording/reproducing device 200 generates the new manual reservation information including the priority information 523 and the like incorporated therein. Then the CPU 290 incorporates the new manual reservation information as the reservation information 520 in the video recording reservation list information 500 according to necessity with the reservation information incorporating unit 292. Further the CPU 290 makes the reservation information generating unit 291 store the EPG data acquired by the NIM 211 in the HDD 270. When the reservation information generating unit 291 acquires the automatic video recording reservation request information, the reservation information generating unit 291 checks a keyword for this automatic video recording reservation request information, and acquires the EPG data stored in the HDD 270. Then, when the reservation information generating unit 291 recognizes that there is a program corresponding to the recognized keyword, the reservation information generating unit 291 generates the priority information 523 including automatic reservation priority setting information indicating the "intermediate" priority. Then the reservation information generating unit 291 generates new automatic reservation information including this priority information 523 and the like incorporated therein. When the reservation information incorporating unit 292 recognizes that the reservation information 520 corresponding to the manual video recording reservation has been incorporated in the video recording reservation list information 500, the reservation information incorporating unit 292 determines whether the reservation information 520 and the new automatic reservation information overlap with each other or not. When the reservation information incorporating unit 292 determines that the reservation information 520 and the new automatic reservation information overlap with each other, the reservation information incorporating unit 292 recognizes priority of the reservation information 520 and that of the new automatic reservation information based on the reservation information 520 and the priority information 523 in the new automatic reservation information. When the reservation information incorporating unit 292 recognizes that priority of the new automatic reservation information is higher than that of the reservation information 520 corresponding to the manual video recording reservation, the reservation information incorporating unit 292 deletes the reservation information 520 corresponding to the manual video recording reservation from the video recording reservation list information 500, and incorporates the new automatic reservation information as the reservation information 520 in the video recording reservation list information 500.

Because of the configuration, when new automatic reservation information with the priority of an automatic video recording reservation of contents satisfying a user set to "intermediate" overlaps with the reservation information 520 corresponding to a manual video recording reservation of contents not so much satisfying the user's taste and having the priority set to "low", the CPU 290 of the recording/reproducing device 200 can set the automatic video recording reservation having priority set to "high" and satisfying the user's taste. Therefore, the recording/reproducing device 200 prevents the contents not so much satisfying the user's taste from being reserved for video recording with the sacrifice of contents satisfying the user's taste more efficiently as compared to the conventional technology. Therefore, the recording/reproducing device 200 can correctly acquire contents data.

The reservation information generating unit 291 acquires the EPG data acquired by the NIM 211, and recognizes a keyword for automatic video recording reservation request information. Then the reservation information generating unit 291 generates new automatic reservation information including various types of information required for automatic video recording reservation of contents corresponding to the keyword based on the EPG data. Then the reservation information incorporating unit 292 incorporates this new automatic reservation information as the reservation information 520 in the video recording reservation list information 500. Because of the configuration as described above, a user can make the recording/reproducing device 200 reserve video recording of contents satisfying the user's taste with a simple method in which the user sets only a keyword relating to contents satisfying the user's taste. Therefore, convenience in use of the recording/reproducing device 200 can be improved.

When the reservation information generating unit 291 acquires the manual video recording reservation request information, the reservation information generating unit 291 generates, based on basic video recording setting information in this manual video recording reservation request information, new manual reservation information incorporating the basic video recording information 521 with video recording start date and time or video recording finish date and time information described therein. Further, when the reservation information generating unit 291 acquires the automatic video recording reservation request information, the reservation information generating unit 291 generates new automatic reservation information incorporating therein the basic video recording information 521 with video recording start date and time or video recording finish date and time information described therein. Further the reservation information incorporating unit 292 incorporates the new manual reservation information or new automatic reservation information as the reservation information 520 in the video recording reservation list information 500 according to necessity. When new automatic reservation information is generated, for instance, by the reservation information generating unit 291, the reservation information incorporating unit 292 determines, based on this new automatic reservation information and the basic video recording information 521 in the reservation information 520 corresponding to the new manual reservation information whether at least a portion of recording time for the automatic video recording reservation and that for a manual video recording reservation overlap. When the reservation information incorporating unit 292 determines that at least a portion of the recording time overlaps, the reservation information incorporating unit 292 deletes, for instance, the reservation information 520 corresponding to the manual video recording reservation, and incorporates the new automatic reservation information as the reservation information 520. Because of the configuration, when a recording time for the automatic video recording reservation and that for a manual video recording reservation overlap, it is possible to set only one of the automatic video recording reservation and the manual video recording reservation based on the priority information 523 corresponding to each video recording reservations. Therefore the recording/reproducing device 200 can acquire contents data more properly.

The reservation information generating unit 291 recognizes, based on manual reservation priority setting information in the manual video recording reservation request information set and inputted by a user, which in "high", "intermediate", and "low" priority the manual video recording reservation is, and then the reservation information generating unit 291 generates new automatic reservation information with the priority information 523 indicating the recognized priority incorporated therein. Further when the reservation information generating unit 291 acquires the automatic video recording reservation request information set and inputted by the user, the reservation information generating unit 291 generates new automatic reservation information including, for instance, the priority information 523 indicating that priority of the automatic video recording reservation is "intermediate". Then the reservation information incorporating unit 292 incorporates the new manual reservation information or new automatic reservation information as reservation information 520 in the video recording reservation list information 500 according to necessity. Because of the configuration, when a user sets priority of a manual video recording reservation for contents not so much satisfying the user's taste to "low", contents for an automatic video recording satisfying the user's taste and overlapping with contents not so much satisfying the user's taste can be recorded preferentially. Because of the feature, the user can set priority reflecting the user's intention to each of contents manually reserved for video recording, which enables improvement in convenience of the recording/reproducing device 200 in use.

When the reservation information generating unit 291 acquires automatic video recording reservation request information, the reservation information generating unit 291 determines whether a keyword for this automatic video recording request information is a specified keyword previously set by the user or not. When the reservation information generating unit 291 determines that the keyword is a specified one, the reservation information generating unit 291 generates the flag 524 for comparing priority incorporating flag information set to "1". On the other hand, when the reservation information generating unit 291 determines that the keyword is not a specified one, the reservation information generating unit 291 generates the flag 524 for comparing priority incorporate flag information set to "0". Then the reservation information generating unit 291 generates new automatic reservation information including the flag 524 for comparing priority. Then, when the reservation information incorporating unit 292 recognizes that priority of the new automatic reservation information is at the same level as that of the reservation information 520 corresponding to a manual video recording reservation, the reservation information incorporating unit 292 recognizes the setting state of the flag 524 for comparing priority incorporated in the new automatic reservation information. When the reservation information incorporating unit 292 recognizes that the flag 524 for comparing priority is set to "1", namely that the new automatic reservation information has been generated by a specified keyword, the reservation information incorporating unit 292 deletes the reservation information 520 corresponding to the manual video recording reservation, and incorporates the new automatic reservation information as reservation information 520. Because of the configuration, a user can make a reservation for video recording of contents especially satisfying the user's taste more preferentially than the contents with priority set to "intermediate" and manually reserved for video recording by previously setting a keyword relating to contents satisfying the user's taste. Therefore, a user can achieve a preferential reservation for recording contents especially satisfying the user's taste with a simple method in which the user sets a keyword relating to contents especially satisfying the user's taste and sets priority of a manual video recording reservation for contents not so much satisfying the user's taste as compared to the contents especially satisfying the user's taste to "intermediate". Because of the features as described above, the recording/reproducing device 200 can be improved in convenience thereof in use.

When a manual video recording reservation and an automatic video recording reservation overlap with each other, the reservation information incorporating unit 292 incorporates the reservation information 520 corresponding to contents satisfying the user's taste in the video recording reservation list information 500 based on the priority information 523 corresponding to each video recording reservation. Then he video recording control unit 293 records the contents satisfying the user's taste in the HDD 270 based on the reservation information 520 incorporated by the reservation information incorporating unit 292 in the video recording reservation list information 500. Because of this configuration, the recording/reproducing device 200 enables reserved recording of contents satisfying the user's taste more accurately as compared to the conventional technology. Therefore the recording/reproducing device 200 ensuring improved convenience in use is provided.

Variants of the Embodiment

The present invention is not limited to the embodiment described above, and includes variants in a scope where the objects of the present invention as described above are achieved.

In the configuration described above, when a manual video recording reservation and an automatic video recording reservation overlaps with each other, either one of the video recording reservations is preferentially treated by the reservation information incorporating unit 292, but the present invention is not limited to this configuration, and for instance, the configuration as described below may be employed. Namely, the configuration is allowable in which, when at least either one of a manual video recording reservation and an automatic video recording reservation, and a bar code video recording reservation set by reading two-dimensional bar code such as JAN (Japanese Article Number) code or QR (Quick Response) overlap with each other, either one of the video recording reservations is preferentially treated by the reservation information incorporating unit 292. With the configuration as described above, contents satisfying a user's taste can preferentially be recorded even in the recording/reproducing device 200 in which a video recording reservation can be set with two-dimensional bar code. Therefore, with the present invention, convenience in use of the recording/reproducing device 200, in which a video recording reservation is made with two-dimensional bar code, can be improved.

In the configuration described above, when a recording time for a manual video recording reservation and that for an automatic video recording reservation overlap with each other, either one of the video recording reservations is preferentially treated, but also the configuration is allowable in which, when contents manually reserved for video recording and those automatically reserved for video recording overlap with each other, either one of the video recording reservations is preferentially treated. With the configuration as described above, the recording/reproducing device 200 records only either one of the contents when contents manually reserved for video recording and those automatically reserved for video recording overlap with each other, and therefore unnecessary contents will never be recorded in the HDD 270. Therefore the recording/reproducing device 200 can acquire contents data more properly.

In the configuration described above, when priority of a manual video recording reservation is at the same level as that of an automatic video recording reservation, the reservation information incorporating unit 292 determines whether the automatic video recording reservation should preferentially be treated or not based on the flag 524 for comparing priority indicating, for instance, whether the new automatic reservation information has been generated based on a specified keyword or not, but the present invention is not limited to this configuration, and also, for instance, the following configuration may be employed in the present invention. Namely, the reservation information generating unit 291 checks times of video recording or viewing history for contents (described as related contents hereinafter) relating the contents automatically reserved for video recording. The related contents are, for instance, those hit with the same or related keyword, or those belonging to the same series and the like. Further also the configuration is allowable in which, the flag 524 for comparing priority for new automatic reservation information is set to "1" when the related contents are recorded or viewed specified times or more, and to "0" when the related contents are not recorded nor viewed specified times. With the contents described above, the reservation information incorporating unit 292 can preferentially treat an automatic video recording reservation for contents, related contents of which are recorded or viewed specified times or more, when priority of a manual video recording reservation is at the same level as that of an automatic video recording reservation. Therefore, the recording/reproducing device 200 can preferentially treat an automatic video recording reservation, for instance, for contents satisfying a user's contents corresponding to times of recording or viewing of related contents, so that contents data can be acquired more properly.

In the configuration in which the flag 524 for comparing priority is set based on the viewing history as described above, also the configuration is allowable in which the flag 524 for comparing priority is set based on the viewing history in a specified period unit such as, for instance, three months. With the configuration as described above, as the viewing history three months or more before is not reflected to the setting state of the flag 524 for comparing priority, even if the user's taste changes during the three months, the flag 524 for comparing priority can be set only based on the viewing history after the change in the user's taste. Therefore, the recording/reproducing device 200 can preferentially set an automatic video recording reservation by reflecting changes in a user's taste.

Further the processing state of related contents carried out by the access control unit 294 can be checked, for instance, by the reservation information generating unit 291. The configuration is allowable in which the flag 524 for comparing priority is set to "1" or "0" based on the processing state checked and recognized as described above. More specifically, the configuration is allowable in which the flag 524 for comparing priority for new automatic reservation information is set to "1" when the time spent for reproducing or editing the contents is not less than a specified period of time, or when times of reproduction or an editorial work is not less than a prespecified value, and otherwise set to "0". Further the configuration is allowable in which the flag 524 for comparing priority is set to "1" when contents of the processing is an editorial work, and to "0" when the contents of the processing is reproduction. With the configuration as described above, the reservation information incorporating unit 292 can preferentially treat an automatic video recording reservation, when priority of a manual video recording reservation is at the same level as that of an automatic video recording reservation, based on the processing state of the related contents. Therefore, the recording/reproducing device 200 can preferentially treat an automatic video recording reservation for contents in response to the processing state reflecting the user's taste more than the times of reproduction of related contents or viewing history. Because of the feature, the recording/reproducing device 200 can acquire contents data more properly. Further the user can set priority of an automatic video recording reservation only by reproducing or editing the related contents, and is not required to carry out any specific operation for setting or inputting data. Therefore convenience in use of the recording/reproducing device 200 can be improved.

Further also the configuration is allowable in which the flag 524 for comparing priority is set by the reservation information generating unit 291 to "1" when the contents automatically reserved for video recording is a charged broadcast, and "0" when the contents is a charge-free broadcast. With the configuration as described above, when priority of a manual video recording reservation is at the same level as that of an automatic video recording reservation, the reservation information incorporating unit 292 can preferentially treat an automatic video recording reservation for a charged broadcasting. Because of the feature as described above, the recording/reproducing device 200 can carry out reserved video recording making effective use of charged broadcasting and also can acquire contents data further properly.

Further the configuration is allowable in which the flag 524 for comparing priority for new automatic reservation information is set by the reservation information generating unit 291 to "1" when contents automatically reserved for video recording is not broadcasted again, and to "0" when the contents is broadcasted again. With the configuration as described above, the reservation information incorporating unit 292 can preferentially treat an automatic video recording reservation for contents not broadcasted again when priority of a manual video recording reservation is at the same level as that of an automatic video recording reservation. Therefore, the recording/reproducing device 200 can preferentially treat an automatic video recording reservation for contents not broadcasted again, and can acquire contents data further properly.

In addition, also the configuration is allowable in which the reservation information generating unit 291 checks keyword setting history and the flag 524 for comparing priority of new automatic reservation information is set to "1" when a frequency of keyword setting is high, and to "0" when the keyword setting frequency is low. The setting history may be one for a prespecified period unit such as three months. With the configuration as described above, the user can have the flag 524 for comparing priority set to "1" only by frequently setting a keyword relating to contents especially satisfying the user's taste. In this case, the user is not required to set the keyword as a specific keyword, which is a different point from the embodiment described above. Because of the features, convenience in use of the recording/reproducing device 200 can be improved as compared to that in the embodiment described above.

In the configuration described above, priority of a manual video recording reservation is set to any of the three stages; "high", "intermediate", and "low" and priority of an automatic video recording reservation is set to "intermediate", but the present invention is not limited to this configuration, and for instance, the following configuration may also be employed. Namely, the configuration is allowable in which the reservation information generating unit 291 preferentially treats a manual video recording reservation based on the manual reservation priority setting information and sets "manual reservation preferred" indicating that the manual video recording reservation is preferentially treated than a overlapping automatic video recording reservation, or sets "automatic reservation preferred" indicating that a manual video recording reservation is not preferentially treated than an automatic video recording reservation. Further the configuration is allowable in which the reservation information generating unit 291 sets priority of an automatic video recording reservation to the "automatic reservation preferred" when a keyword is a specified one, and to "manual reservation preferred" when the keyword is not a specified one. With the configuration as described above, the recording/reproducing device 200 is not required to incorporate the priority information 523 in the reservation information 520 corresponding to a manual video recording reservation nor to an automatic video recording reservation, and a volume of information in the reservation information 520 can be suppressed to the minimum level. Because of the configuration, the number of reservation information 520 allowable to be incorporated in the video recording reservation list information 500 can be increased as compared to that in the embodiment described above.

The configuration is allowable in which the reservation information generating unit 291 sets priority of a manual video recording reservation to, for instance, "intermediate", and also sets priority of an automatic video recording reservation to two stages based on whether a keyword for the automatic video recording reservation request information is a specified one or not. More specifically, the configuration is allowable in which the priority is set to "high" when the keyword is a specified one, and to "low" when the keyword is not a specified one. With the configuration as described above, the recording/reproducing device 200 can automatically set priority of an automatic video recording reservation without requiring a user to set the manual reservation priority setting information. Further the recording/reproducing device 200 can automatically set priority of an automatic video recording reservation to any of a plurality of stages only by requesting a user to set a specific keyword relating to the contents satisfying the user's taste. Therefore, the recording/reproducing device 200 can preferentially treat an automatic video recording reservation for contents especially satisfying the user's taste than a manual video recording reservation without requiring a user to set the manual reservation priority setting information each time like in the embodiment described above. Because of the features, convenience in use of the recording/reproducing device 200 can further be improved.

Further the configuration is allowable in which the reservation information generating unit 291 sets priority of an automatic video recording reservation based on times of recording or viewing of the related contents. With the configuration as described above, the recording/reproducing device 200 can automatically set priority of an automatic video recording reservation only by requesting a user to record the related contents, and also can preferentially treat an automatic video recording reservation for contents corresponding to the times of recording or viewing of the related contents and reflecting the user's taste without requiring the user to set the manual reservation priority setting information each time like in the embodiment described above. Therefore it is possible to provide the recording/reproducing device 200 which is convenient in use and can properly acquire contents data.

Also the configuration is allowable in which the reservation information generating unit 291 sets priority of an automatic video recording reservation according to the state of processing of the related contents executed by the access control unit 294. The state of processing as used herein indicates, for instance, any of the processing states as described above. With the configuration as described above, the recording/reproducing device 200 can automatically set priority of an automatic video recording reservation to any of the plurality of stages only by requesting a user to reproduce or edit the related contents, and also can preferentially treat an automatic video recording reservation for contents corresponding to the processing state of the related contents and reflecting the user's taste without requiring the user to set the manual reservation priority setting information each time like in the embodiment described above. Therefore, it is possible to provide the recording/reproducing device 200 which is convenient in use and can acquire contents data properly.

Further the configuration is allowable in which the reservation information generating unit 291 sets priority of an automatic video recording reservation whether the contents are charged broadcasting or not, or whether the contents are broadcasted again or not. With the configuration as described above, the recording/reproducing device 200 can automatically set priority of an automatic video recording reservation to any of a plurality of stages without requiring a user to perform any specific operation, and can preferentially treat an automatic video recording reservation for contents making effective use of a charged broadcasting or those not broadcasted again without requiring a user to set the manual reservation priority setting information like in the embodiment described above. Because of the feature, it is possible to provide the recording/reproducing device 200 which is convenient in use and can properly acquire contents data.

In the configuration described above, the flag 524 for comparing priority for new automatic reservation information or priority of an automatic video recording reservation is set according to the times of recording or viewing or the processing state of the related contents for the contents automatically reserved for video recording, but the present invention is not limited to the configuration, and for instance the following configuration may be employed. Namely, the flag 524 for comparing priority for new manual reservation information or priority may be set according to the times of recording or viewing or the processing state of the related contents for the contents manually reserved for video recording. With the configuration described above, the recording/reproducing device 200 can preferentially treat a manual video recording reservation according to a user's taste and can acquire contents data further properly.

Also the configuration is allowable in which the reservation information generating unit 291 sets priority of a manual video recording reservation to any of three stages of, for instance, "1", "3", and "5" based on the manual reservation priority setting information and also sets priority of an automatic video recording reservation to any of three stages of "2", "4" and "6" based on a keyword in the automatic video recording reservation request information. More specifically, the configuration is allowable in which priority of an automatic video recording reservation is set to "6" when a keyword is a first specified keyword corresponding to contents especially satisfying the user's taste, to "4" when the keyword is a second specified keyword corresponding to contents satisfying the user's state, and to "2" when the keyword is not the first specified keyword nor the second specified keyword. In this case, a larger value indicates higher priority. With the configuration as described above, the recording/reproducing device 200 can set an automatic video recording reservation with priority reflecting the user's state for contents in detail. Therefore convenience in use of the recording/reproducing device 200 can further be improved.

In the configuration described above, the processing controller or data processor according to the present invention is applied to the recording/reproducing device 200 for storing contents data, but the present invention is not limited to the configuration. For instance, in addition to a TV broadcasting program, also a radio broadcasting program and a satellite broadcasting program may be processed by the present invention. Further the present invention is not limited to application thereof to the recording/reproducing device 200, and may be applied to a recorder capable only recording data, or an independent processing controller for managing information for a video recording reservation in a recorder or in the recording/reproducing device 200.

In the embodiment described above, each function is provided as a program, but may be implemented on hardware such as a circuit board or as an IC (Integrated Circuit), and can be utilized in any state. In a case where each function is readout for use from a program or a separated recording medium, handling is easy and a range of utilization thereof can easily be extended.

Specific structures and procedures for carrying out the present invention may be changed according to necessity in a range in which objects of the present invention can be achieved.

Effects of the Embodiment

As described above, in the embodiment described above, the CPU 290 of the recording/reproducing device 200 generates, when manual video recording reservation request information is acquired by the reservation information generating unit 291, new manual reservation information incorporating therein, for instance, the priority information 523 indicating which of "high", "intermediate", and "low" priority is set by a user. Then the CPU 290 controls the reservation information incorporating unit 292 to incorporate the new manual reservation information as reservation information 520 in the video recording reservation list information 500 according to necessity. Further when the reservation information generating unit 291 acquires automatic video recording reservation request information, the reservation information generating unit 291 recognizes a keyword for this automatic video recording reservation request information, and acquires the EPG data previously stored in the HDD 270. Then when the reservation information generating unit 291 recognizes based on the EPG data that there is a program corresponding to the recognized keyword, the reservation information generating unit 291 generates new automatic reservation information incorporating, for instance, the priority information 523 including automatic reservation priority setting information indicating that the priority is "intermediate". Then, when the reservation information incorporating unit 292 recognizes that the reservation information 520 corresponding to the manual video recording reservation is incorporated in the video recording reservation list information 500, the reservation information incorporating unit 292 determines whether the reservation information 520 and the new automatic reservation information overlap with each other or not. When the reservation information incorporating unit 292 determines that the reservation information 520 and the new automatic reservation information overlap with each other, the reservation information incorporating unit 292 recognizes priority of the reservation information 520 as well as of the new automatic reservation information based on the reservation information 520 and the priority information 523 in the new automatic reservation information. When the reservation information incorporating unit 292 recognizes that priority of the new automatic reservation information is higher than that of the reservation information 520 corresponding to the manual video recording reservation, the reservation information incorporating unit 292 deletes the reservation information 520 corresponding to the manual video recording reservation from the video recording reservation list information 500, and incorporates the new manual reservation information as the reservation information 520 in the video recording reservation list information 500.

Because of the features described above, when new automatic reservation information corresponding to an automatic video recording reservation for contents satisfying a user's taste with the priority set to "intermediate" overlaps with the reservation information 520 corresponding to a manual video recording reservation for contents not so much satisfying the user's taste with the priority set to "low", the CPU 290 of the recording/reproducing device 200 can set the automatic video recording reservation for contents satisfying the user's taste with the priority at a higher level with the reservation information incorporating unit 292. Therefore, the recording/reproducing device 200 can reduce a frequency of preferential treatment of video recording reservations for contents not so much satisfying the user's taste than those satisfying the user's taste. Therefore the recording/reproducing device 200 can properly acquire contents data.

The priority application Number JP 2004-164937 upon which this patent application is based is hereby incorporated by reference.

What is claimed is:

1. A processing controller controlling a data acquiring unit, which is adapted for acquiring data, to acquire said data, comprising:
    a request information acquiring unit for acquiring request information which requests that said data concerning specified contents or said data related to prespecified contents be acquired by said data acquiring unit;
    a guidance information acquiring unit for acquiring guidance information corresponding to and concerning contents of said data acquired by said data acquiring unit based on said request information;
    a priority information acquiring unit for acquiring priority information concerning priority for being acquired by said data acquiring unit in data concerning said specified contents as well as in data related to prespecified contents based on said request information;
    a comparing unit for comparing overlapping state of the contents of said acquired guidance information; and
    an acquiring control unit for controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

2. The processing controller according to claim 1, wherein said request information which requests that said data related to said prespecified contents be acquired by said data acquiring unit is character information;
    said processing controller further comprises a data-related information acquiring unit for acquiring data-related information including said guidance information and character information related to said data;
    said request information acquiring unit acquires said character information as said request information; and
    said guidance information acquiring unit acquires said guidance information for said data-related related information which includes said character information and which relates to said character information acquired by said request information acquiring unit.

3. The processing controller according to claim 1, wherein said data is distributed by a distributing unit; and
    said guidance information is distribution time information concerning time at which said data is distributed from said distributing unit.

4. The processing controller according to claim 1, wherein said priority information acquiring unit generates and acquires said priority information based on the conditions for acquiring said data indicated by said request information with said data fetching unit.

5. The processing controller according to claim 1, wherein said priority information acquiring unit generates and acquires said priority information based on the number of times for which said data related to at least either one of the data concerning said specified contents and the data related to said prespecified data has been acquired.

6. The processing controller according to claim 1, wherein said priority information acquiring unit generates and acquires said priority information based on the processing state of said data related to at least either one of the data concerning said specified contents and the data related to said prespecified data, the processing being executed by an processing executing unit adapted for processing said data.

7. The processing controller according to claim 1, wherein
said data is distributed with or without charge by a distributing unit; and
said priority information acquiring unit generates and acquires said priority information based on whether either one of data concerning said specified contents and data related to said prespecified contents is distributed with charge or not.

8. The processing controller according to claim 1, wherein
said data is data redistributed or data not redistributed by the distributing unit; and
said priority information acquiring unit generates and acquires said priority information based on whether either one of the data concerning said specified contents and data related to said prespecified contents is redistributed or not.

9. The processing controller according to claim 1, wherein
said request information which requests that the data concerning the specified contents be acquired includes priority information concerning said priority in said data concerning the specified contents; and
said priority information acquiring unit generates and acquires said priority information in said data related to the prespecified contents.

10. The processing controller according to claim 1, wherein
said request information which requests that the data concerning the specified contents be acquired includes priority information concerning said priority in said data concerning the specified contents;
said priority information acquiring unit generates and acquires said priority information in said data related to the specified contents; and
upon recognizing that priority of said priority information is at the same level, said acquiring controlling unit controls to acquire, based on the condition for acquiring said data indicated by said request information with said data acquiring unit, either one of the data with said data acquiring unit.

11. The processing controller according to claim 1, wherein
said request information which requests that said data concerning the specified contents be acquired includes priority information concerning said priority in said data concerning the specified contents;
said priority information acquiring unit generates and acquires said priority information in said data related to the specified contents; and
upon recognizing that priority of said priority information is at the same level, said acquiring controlling unit controls to acquire, based on the number of times for which said data related to at least either one of the data concerning said specified contents and the data related to said prespecified data has been acquired, either one of the data with said data acquiring unit.

12. The processing controller according to claim 1, wherein
said request information which requests that said data concerning the specified contents be acquired includes priority information concerning said priority in said data concerning the specified contents;

said priority information acquiring unit generates and acquires said priority information in said data related to the specified contents; and
upon recognizing that priority of said priority information is at the same level, said acquiring controlling unit controls to acquire, based on the processing state of said data related to at least either one of the data concerning said specified contents and the data related to said prespecified data, either one of the data with said data acquiring unit.

13. The processing controller according to claim 1, wherein
said data is distributed with or without charge by a distributing unit;
said request information which requests that said data concerning the specified contents be acquired includes priority information concerning said priority in said data concerning the specified contents;
said priority information acquiring unit generates and acquires said priority information in said data related to the specified contents; and
upon recognizing that priority of said priority information is at the same level, said acquiring controlling unit controls to acquire, based on whether either one of data concerning said specified contents and data related to said prespecified contents is distributed with charge or not, either one of the data with said data acquiring unit.

14. The processing controller according to claim 1, wherein
said data is data redistributed or data not redistributed by the distributing unit;
said request information which requests that said data concerning the specified contents be acquired includes priority information concerning said priority in said data concerning the specified contents;
said priority information acquiring unit generates and acquires said priority information in said data related to the specified contents; and
upon recognizing that priority of said priority information is at the same level, said acquiring controlling unit controls to acquire, based on whether either one of the data concerning said specified contents and data related to said prespecified contents is redistributed or not, either one of the data with said data acquiring unit.

15. A data processor comprising:
the processing controller according to claim 1;
the data acquiring unit; and
a data storage controlling unit controlling to store said data acquired by the data acquiring unit in a storage unit.

16. A processing controlling method for controlling, with a computing unit, a data acquiring unit adapted for acquiring data to acquire prespecified said data, wherein said computing unit executes the steps of:
acquiring request information which requests that said data concerning specified contents or said data related to prespecified contents be acquired by said data acquiring unit;
acquiring guidance information corresponding to and concerning contents of said data acquired by said data acquiring unit based on said request information;
acquiring priority information concerning priority for being acquired by said data acquiring unit in data concerning said specified contents as well as in data related to prespecified contents based on said request information;

comparing overlapping state of the contents of said acquired guidance information; and controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

17. A processing controlling program which makes a computing unit, for the purpose of controlling a data acquiring unit adapted for acquiring data to acquire prespecified said data, function as a processing controller, said processing controller comprising:

a request information acquiring unit for acquiring request information which requests that said data concerning specified contents or said data related to prespecified contents be acquired by said data acquiring unit;

a guidance information acquiring unit for acquiring guidance information corresponding to and concerning contents of said data acquired by said data acquiring unit based on said request information;

a priority information acquiring unit for acquiring priority information concerning priority for being acquired by said data acquiring unit in data concerning said specified contents as well as in data related to prespecified contents based on said request information;

a comparing unit for comparing overlapping state of the contents of said acquired guidance information; and an acquiring control unit for controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

18. A processing controlling program which makes a computing unit, for the purpose of controlling a data acquiring unit adapted for acquiring data to acquire prespecified said data, execute a processing controlling method, said method comprising the steps of:

acquiring request information which requests that said data concerning specified contents or said data related to prespecified contents be acquired by said data acquiring unit;

acquiring guidance information corresponding to and concerning contents of said data acquired by said data acquiring unit based on said request information;

acquiring priority information concerning priority for being acquired by said data acquiring unit in data concerning said specified contents as well as in data related to prespecified contents based on said request information;

comparing overlapping state of the contents of said acquired guidance information; and controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

19. A recording medium which records a processing control program in a manner readable by a computing unit, the processing control program making a computing unit, for the purpose of controlling a data acquiring unit adapted for acquiring data to acquire prespecified said data, function as a processing controller, the processing controller composing:

a request information acquiring unit for acquiring request information which requests that said data concerning specified contents or said data related to prespecified contents be acquired by said data acquiring unit;

a guidance information acquiring unit for acquiring guidance information corresponding to and concerning contents of said data acquired by said data acquiring unit based on said request information;

a priority information acquiring unit for acquiring priority information concerning priority for being acquired by said data acquiring unit in data concerning said specified contents as well as in data related to prespecified contents based on said request information;

a comparing unit for comparing overlapping state of the contents of said acquired guidance information; and an acquiring control unit for controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

20. A recording medium which records a processing controlling program in a manner readable by a computing unit, the processing controlling program making a computing unit, for the purpose of controlling a data acquiring unit adapted for acquiring data to acquire prespecified said data, execute a processing controlling method, said method comprising the steps of:

acquiring request information which requests that said data concerning specified contents or said data related to prespecified contents be acquired by said data acquiring unit;

acquiring guidance information corresponding to and concerning contents of said data acquired by said data acquiring unit based on said request information;

acquiring priority information concerning priority for being acquired by said data acquiring unit in data concerning said specified contents as well as in data related to prespecified contents based on said request information;

comparing overlapping state of the contents of said acquired guidance information; and controlling said data acquiring unit to acquire either one of the data concerning said specified contents and the data related to said prespecified contents overlapped with each other in content, based on said priority information in said data concerning the specified contents and said data related to the prespecified contents each corresponding to the guidance information including overlapped contents.

* * * * *